Figure 2:
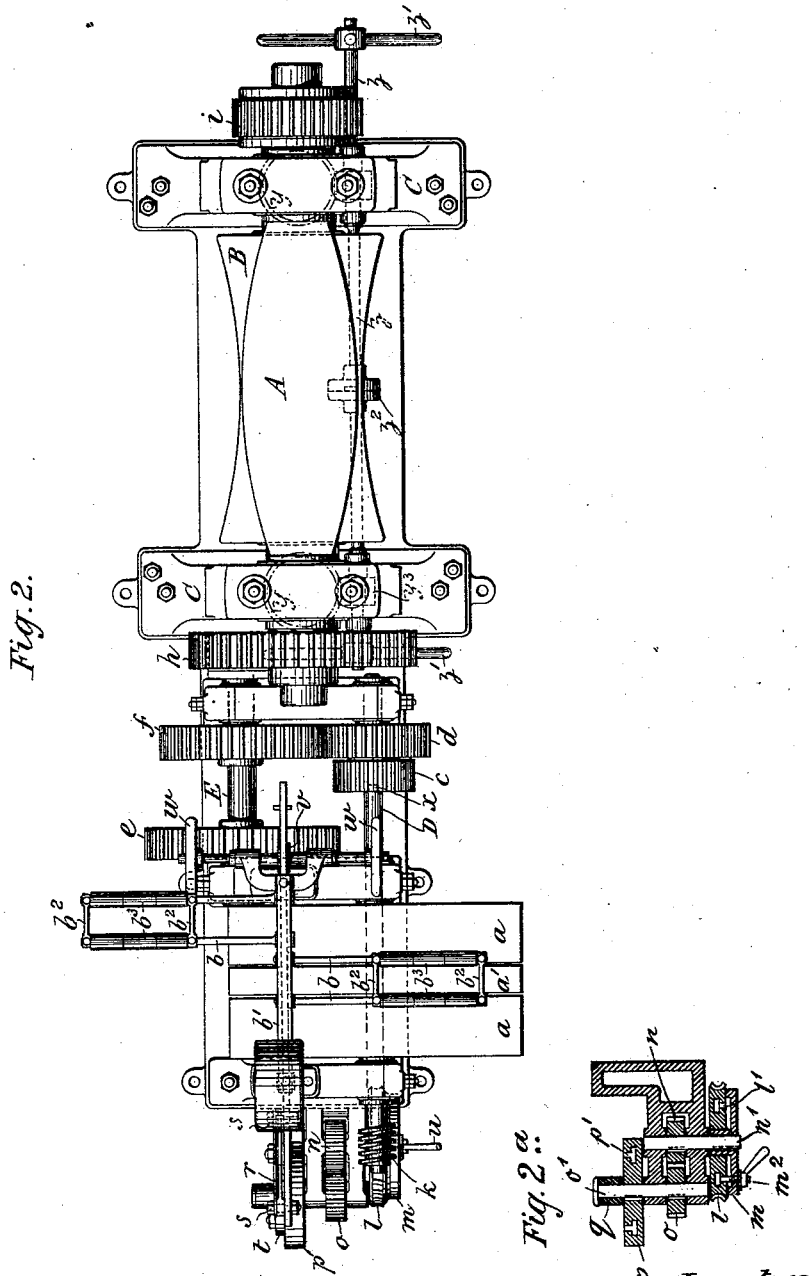

(No Model.) 4 Sheets—Sheet 1.
T. C. BARRACLOUGH & T. T. HEATON.
PROCESS OF AND MACHINERY FOR PRODUCING METAL BARREL BODIES.
No. 495,147. Patented Apr. 11, 1893.
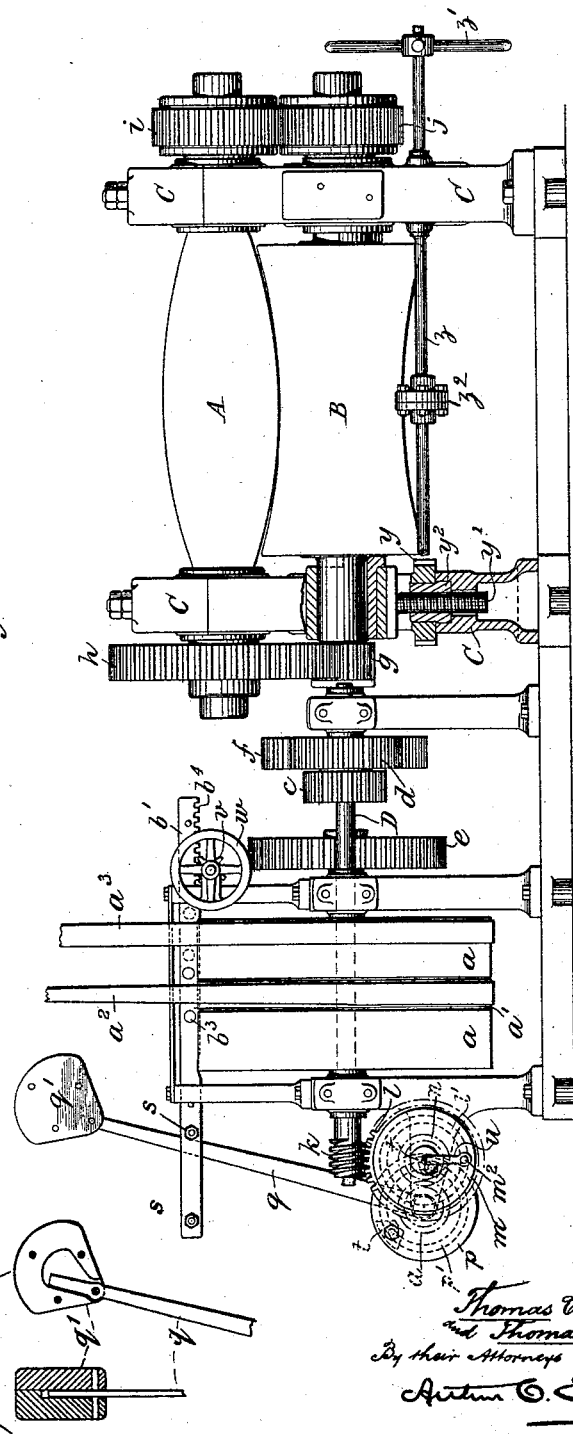
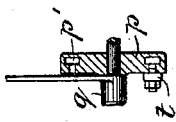
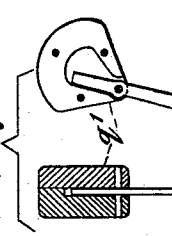
Witnesses:
John Becker
Fred White
Inventors:
Thomas Critchley Barraclough
and Thomas Jannett Heaton,
By their Attorneys
Arthur C. Fraser & Co.

(No Model.) 4 Sheets—Sheet 2.

T. C. BARRACLOUGH & T. T. HEATON.
PROCESS OF AND MACHINERY FOR PRODUCING METAL BARREL BODIES.

No. 495,147. Patented Apr. 11, 1893.

Fig. 2ª.

Witnesses:
John Becker
Fred White

Inventors:
Thomas Critchley Barraclough
and Thomas Jarrett Heaton,
By their Attorney
Arthur C. Fraser (No Model.) 4 Sheets—Sheet 3.

T. C. BARRACLOUGH & T. T. HEATON.
PROCESS OF AND MACHINERY FOR PRODUCING METAL BARREL BODIES.

No. 495,147. Patented Apr. 11, 1893.

Witnesses:
John Becker
Fred White

Inventors:
Thomas Critchley Barraclough
and Thomas Tannett Heaton,
By their Attorneys
Arthur C. Fraser & Co.

(No Model.) 4 Sheets—Sheet 4.

T. C. BARRACLOUGH & T. T. HEATON.
PROCESS OF AND MACHINERY FOR PRODUCING METAL BARREL BODIES.

No. 495,147. Patented Apr. 11, 1893.

UNITED STATES PATENT OFFICE.

THOMAS CRITCHLEY BARRACLOUGH, OF LONDON, AND THOMAS TANNETT HEATON, OF CHESTERFIELD, ENGLAND.

PROCESS OF AND MACHINERY FOR PRODUCING METAL BARREL-BODIES.

SPECIFICATION forming part of Letters Patent No. 495,147, dated April 11, 1893.

Application filed August 1, 1892. Serial No. 441,857. (No model.)

*To all whom it may concern:*

Be it known that we, THOMAS CRITCHLEY BARRACLOUGH, of London, and THOMAS TANNETT HEATON, of Chesterfield, England, have jointly invented a certain new and useful Process or Method of Producing Metal Barrel-Bodies or other Articles of Bent Form and the Machinery for Carrying the Same into Effect, of which the following is a specification.

Our invention in part consists of a new process or method of producing metal articles of bent form and is more particularly intended for producing barrel bodies of steel or other metals, but is also applicable to producing other bent articles of convex exterior.

We will describe the invention as applied to producing a steel barrel body and in this specification the word "curve" relates to the bellying of the sheet crosswise and the word "bend" to the bending of the sheet lengthwise. The sheets of steel or blanks are previously cut to dimensions of which the length is such that when increased by the rolling process it is equal to the circumference of the barrel plus an allowance for an overlap for welding, while the width represents the length of the barrel.

The process of forming a barrel body consists in simultaneously bending and curving a steel sheet or blank by passing it a number of times, varying according to the thickness and nature of the material and the contour of the rollers, between two horizontal or vertical rollers one of which is of convex contour and the other of concave contour, the curve or contour of the concave roller corresponding approximately with the curve, contour or belly required in the barrel body. The convex roller in its contour is not turned parallel to the concave roller but their relative form is of such a character that when the sheet is in the nip of the rollers it, while forced to assume a curved form crosswise, undergoes simultaneously a rolling-action chiefly in the center. This rolling action causes the sheet to increase in length, but in consequence of the nip being greatest at the center of the sheet the increase in length is naturally greater at its center than at its edges. Having already been forced into a curved form crosswise the effect of increasing the length of the sheet at its center is to cause it to gradually bend round the convex roller and assume a bent form having a greater circumference in the middle than at the ends. The sheet having thus assumed the form of a barrel body, its ends are trimmed by means of suitable apparatus, then welded together and the complete barrel body is thus obtained. In rolling we preferably do not let the sheet pass completely out of the rollers but reverse them and thus cause the sheet to pass constantly from end to end and back. As soon as the bend is nearly complete the reversing motion is put out of gear and the bent body or sheet runs continuously; this gives it a finish and removes all trace of buckles which may have been formed during the rolling process. The pressure applied to the rollers should be given gradually as too rapid a change to heavy pressure has a tendency to cause the sheets to buckle. When a sheet is nearly completed and the reversing motion has been put out of gear it is better to use only a light pressure and to run the rollers quickly; this gives a smooth surface both externally and internally to the bent sheet. The bent sheet is removed from the machine by hand, as it has sufficient spring in it to allow it to pass the convex roller; a swinging housing such as is customary in plate rolling machines is thus unnecessary.

Our invention also includes the machinery for rolling the sheets or carrying out our process or method, the characteristic feature of our machinery being the convex and concave rollers hereinbefore described, their faces not being parallel with each other, and the machinery comprises suitable housings or side frames for these rollers, the bearings of one of them being attached to screws which are worked by worm and wheel gearing, and there is a reversing motion of any suitable construction; a reversing motion is however not essential, as in some cases it may be convenient to pass the sheets completely out and to return them between the rollers or to use three-high-rolls. The machine should have guides to keep the sheet with its center in the center of the rollers; these guides may be made adjustable so as to adapt the machine for rolling various lengths of barrel bodies.

When the rollers are horizontal either of them may be the upper one, but in making barrel bodies we prefer the convex one to be at the top. When desired the barrel bodies or other articles can be rolled with one or more circumferential corrugations by having circular ribs on the one roller and corresponding grooves in the other. If considered advisable for certain classes of work auxiliary rollers can be attached to the machine at back or front to support or guide the sheets. This however is not essential and in the case of barrel bodies is not required.

Figure 3:
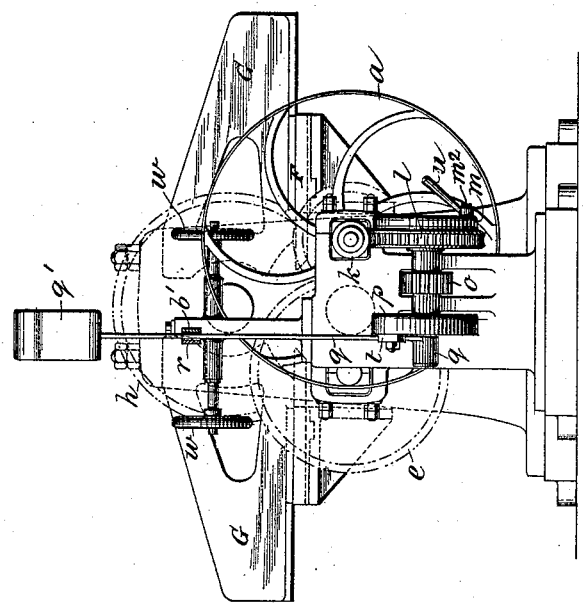
Figure 5:
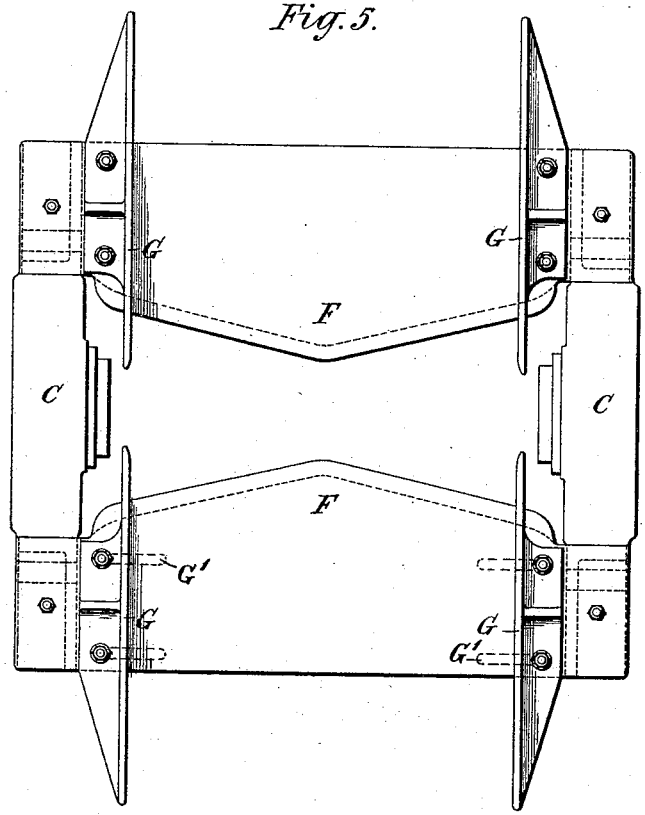
Figure 6:
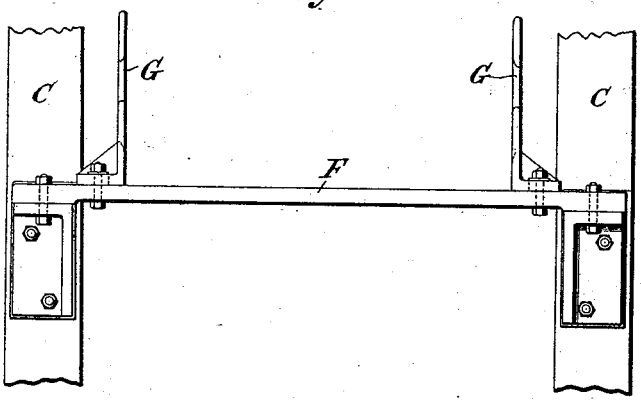

In the accompanying drawings:—Figure 1 is a side elevation of a machine constructed according to our invention and adapted for rolling a barrel body or other article of bent form with a swell or "belly" at the middle. Fig. 2 is a plan and Fig. 3 an end elevation of the machine. The tables and sheet guides are not shown in Figs. 1 and 2 and part of Fig. 1 is sectional to show the gearing for adjusting the height of the bearings of the lower roller. Fig. 1$^a$ is a fragmentary section of a detail of Fig. 1, and Fig. 2$^a$ is a fragmentary horizontal section of part of Fig. 2. Fig. 4 is a detail view showing the disk $p$ in section, one of the dogs $t$ and part of the lever $q$. Fig. 5 is a plan of the tables and guides and Fig. 6 an end elevation of the same.

A is the upper roller which is convex and B the lower roller which is concave. The bearings of these rollers are carried in housings or side frames C C and the height of the bearings of the roller B is adjustable as hereinafter described. The curve or contour of the lower roller B corresponds approximately with the curve or belly required in the barrel bodies to be produced. The curve or contour of the roller A is not parallel with that of the roller B but is such that the surfaces of the two rollers are nearer together in the middle than at their ends, their distance apart gradually increasing from the middle to the ends. The result of this is that when a sheet or blank is in the nip of the roller it is pressed and receives a rolling action chiefly in the center while its two sides or edges are free to assume the shape that the process naturally brings about, that is to say, they tend to adapt themselves to the curve or contour of the concave roller B. The procedure followed in manufacturing a barrel body by means of these rollers has already been herein explained. We will therefore proceed to describe the gearing and other mechanism by which the rollers are driven, their speed varied, their motion reversed automatically at regular intervals, the automatic reversing motion put out of gear, and the reversal effected when required by the act of the attendant.

D is the driving shaft on which are two loose pulleys $a$ $a$ with a fast pulley $a'$ between them, this pulley being driven alternately in reverse directions by the cross belt $a^2$ and the open belt $a^3$.

$b$ $b$ are belt forks carried by the belt bar $b'$; they have connecting links $b^2$ and rollers $b^3$. The connecting links hold the rollers in position endwise and also stiffen the forks.

$c$ is a toothed wheel on the driving shaft on which it is held with a sliding key.

$d$ is a toothed wheel keyed to the wheel $c$.

E is a second motion shaft on which are keyed three toothed wheels $e$ $f$ $g$.

The drawings show the wheel $d$ in gear with the wheel $f$ but by sliding the wheels $c$ and $d$ along their shaft the wheel $c$ can be put into gear with the wheel $e$ and the wheel $d$ out of gear with the wheel $f$ and consequently the speed imparted to the wheel $g$ will be varied in accordance with the respective relative sizes of the wheels $e$, $c$ and the wheels $d$ $f$. The wheels $c$ $d$ are secured in each of their two positions by a catch indicated at $x$ of any suitable kind as will be well understood. The wheel $g$ is always in gear with a wheel $h$ keyed on the shaft of the upper roller A; a wheel $i$ on the other end of this shaft gears with a wheel $j$ of the same size on the shaft of the lower roller B so that the two rollers always rotate at the same speed.

K is a worm keyed to the pulley shaft D; this worm gears with a worm wheel $l$ loose on the boss of a disk $m$ (Fig. 2$^a$). There is a circular groove $l'$ in the worm wheel and a hole in the disk $m$; a bolt $m^2$ whose head is in the circular groove passes through the hole in the disk and has a nut in the form of a handle $u$ which when screwed up tight holds the worm wheel $l$ and the disk $m$ firmly together so that when the worm K causes the worm wheel to rotate the disk $m$ rotates also.

$n$ is a toothed wheel keyed on the shaft $n'$ of the disk $m$ and gearing with a wheel $o$ on a shaft $o'$ on which is also keyed a disk $p$; consequently when the disk $m$ rotates the wheels $n$ and $o$ and the disk $p$ also rotate.

$t$ $t$ (Figs. 2, 3, and 4) are dogs or strikers on the disk $p$; they have a tongue fitting into a circular groove $p'$ in this disk and are held in position by bolts in the circular groove. The dogs $t$ $t$ can be set in any desired position in the circular groove so as to effect the reversal of the motion of the machine at the required times, and thereby cause the sheet to pass continuously and alternately from end to end between the rollers and back again.

$q$ is a lever loose on the shaft $o'$ of the disk $p$; it is actuated by the dogs striking against it alternately; it reaches up to the belt bar $b'$ and pushes against rollers S S on studs fixed to the belt bar $b'$ and thereby pushes the belts $a^2$ $a^3$ by means of the belt forks $b$ $b$ to their proper position on the pulleys. On the top of the lever $q$ is a balance weight $q'$ which rocks on a swivel pin (see Fig. 1$^a$) so that the momentum of its fall may assist the belts in moving over the pulleys.

$r$ is a guide strip fixed to the studs of the rollers $s$ $s$. The lever $q$ works between this strip and the belt bar $b'$ so that any sidewise movement or vibration of the lever is prevented. It will readily be understood that when the worm wheel $l$ and the disk $m$ are held firmly together so that the disk $p$ rotates at the same time as the worm wheel the position of the lever $q$ is reversed every time that one or other of the dogs $t\,t$ comes against it and that therefore the position of the open and crossed belts is changed so as to reverse the rotation of the driving pulley $a'$.

When it is required as for example at the latter part of the operation of rolling a barrel body to allow the machine to run continuously in the same direction, the disk $m$ is freed from the worm wheel $l$ by slacking the nut $u$, so that the disk $m$, wheels $n, o$ and disk $p$ will not rotate, and the lever $q$ will not be acted upon; the machine will then run continuously but its motion can be reversed when required by turning one or other of the hand wheels $w$ which are mounted on a shaft on which is keyed a pinion $v$ gearing with a rack $b^4$ on the belt bar $b'$. The hand wheels $w\,w$, pinion $v$ and rack $b^4$ also serve for starting and stopping the machine.

The height of the bottom roller B is adjusted as follows:—The roller bearings have each a screw $y'$ on which is a nut $y^2$ keyed to a worm wheel $y$. The two worm wheels $y$ are actuated by worms on a shaft $z$ which is fitted with hand wheels $z'$. The shaft $z$ is made in two parts connected by a suitable disk coupling $z^2$. The making of this shaft in two parts enables it to be very easily put into place or removed and has this further advantage that should the two bearings of the roller B be not exactly at the same height either of them can be adjusted by disconnecting the halves of the shaft $z$ and then giving a partial turn to one half so as to raise or lower the corresponding bearing after which the two halves of the shaft are again coupled together.

F F are the tables of the machine; they are secured to the side frames C C.

G G are the guides for the ends of the sheets that are being operated upon; these guides are secured to the tables F F by bolts and nuts as shown. If it be required to adapt the machine for making barrel bodies of various lengths we can either use change guides or the guides can be made adjustable by means of slots in the tables so that they can be moved nearer together or farther apart in a line parallel with the axes of the rolls as will be well understood.

It is not essential to provide for varying the speed of the rollers; where this provision is not required the wheels $c$ and $e$ may be dispensed with and so also may the wheels $d$ and $f$ and the second motion shaft, the wheel $g$ being in such case keyed on the pulley shaft D.

Any other suitable automatic reversing arrangement and hand reversing arrangement may be substituted for those shown, which however we consider well adapted for the purpose of our invention.

What we claim, and desire to secure by Letters Patent, is—

1. The process or method hereinbefore described of simultaneously bending and curving a metal sheet or blank into the form of a barrel body or other article of longitudinally bent form which consists in submitting a sheet or blank of appropriate dimensions to the action of a pair of rollers one of which is convex and the other concave, the curve or contour of one of said rollers corresponding approximately with the curve, contour or belly required in the article to be produced and the curve or contour of the other of said rollers differing from that of said first described roller and being relatively such that the space between the adjacent portions of the peripheries of said rollers is less near the middle, whereby when the sheet passes between the rollers it is nipped only at and near the middle of its width and adapts itself for the remainder of its width to the form of the roller which has a curve or contour corresponding approximately with that required in the article to be produced, substantially as set forth.

2. The process or method hereinbefore described of simultaneously bending and curving a metal sheet or blank into the form of a barrel body or other article of longitudinally bent form which consists in rolling a sheet or blank of appropriate dimensions first backward and forward and then (when the sheet has become sufficiently bent to allow of it) continuously between a pair of rollers one of which is convex and the other concave the curve or contour of one of said rollers corresponding approximately with the curve, contour or belly required in the article to be produced and the curve or contour of the other of said rollers differing from that of said first described roller and being relatively such that the space between the adjacent portions of the peripheries of said rollers is less near the middle, whereby when the sheet passes between the rollers it is nipped only at and near the middle of its width, substantially as set forth.

3. In a machine for simultaneously bending and curving a metal sheet or blank into the form of a barrel body or other article of longitudinally bent form, a convex roller and a concave roller adapted to roll the sheet or blank between them, one of said rollers having a curve or contour corresponding approximately with the curve, contour or belly required in the article to be produced while the curve or contour of the other roller is different from that of the first and relatively such that the space between the adjacent portions of the peripheries of said rollers is less near the middle, whereby the rollers will press or nip the sheet or blank only at and near the middle of its width and the remainder of the width of the sheet will adapt itself to the form of the roller which has a contour corresponding approximately with that required in the article to be produced, substantially as set forth and shown.

4. In a machine for simultaneously bending and curving a metal sheet or blank into the form of a barrel body or other article of longitudinally bent form, the combination with a convex roller and a concave roller adapted to roll the sheet or blank between them and gearing for driving said rollers, the relative curves or contours of said rollers being such that they will press or nip the sheet or blank only at a part of its width as described, of an automatic reversing motion, whereby the rollers are caused to rotate in the two directions alternately and the sheet is alternately passed from end to end between the rollers and back again, substantially as set forth.

5. In a machine for simultaneously bending and curving a metal sheet or blank into the form of a barrel body or other article of longitudinally bent form, the combination with a convex roller and a concave roller adapted to roll the sheet or blank between them and gearing for driving said rollers, the relative curves or contours of said rollers being such that they will press or nip the sheet or blank only at a part of its width as described, of an automatic reversing motion whereby the rollers are caused to rotate in the two directions alternately and means for putting said reversing motion out of action and thereby enabling the rollers to roll continuously without reversing, substantially as and for the purpose set forth.

6. In a machine for simultaneously bending and curving a metal sheet or blank into the form of a barrel body or other article of longitudinally bent form, the combination with a convex roller and a concave roller adapted to roll the sheet or blank between them, and gearing for driving said rollers, the relative curves or contours of said rollers being such that they will press or nip the sheet or blank only at a part of its width as described, of an automatic reversing motion whereby the rollers are caused to rotate in the two directions alternately, means for putting said reversing motion out of action, and a reversing motion adapted to be operated by hand, all substantially as and for the purpose set forth.

7. In a machine for simultaneously bending and curving a metal sheet or blank into the form of a barrel body or other article of longitudinally bent form, the combination with a convex roller and a concave roller adapted to roll the sheet or blank between them, the relative contours or curves of said rollers being such that they will press or nip the sheet or blank only at a part of its width as described, of gearing for driving said rollers as required at either of two speeds relatively to the speed of the pulley shaft, an automatic reversing motion whereby the rollers are caused to rotate in the two directions alternately, means for putting said reversing motion out of action to allow the machine to run continuously and a reversing motion adapted to be operated by hand all substantially as and for the purpose set forth.

8. In a machine for simultaneously bending and curving a metal sheet or blank into the form of a barrel body or other article of longitudinally bent form, the combination with a convex roller and a concave roller adapted to roll the sheet or blank between them, the relative contours or curves of said rollers being such that they will press or nip the sheet or blank only at a part of its width as described, of tables and guides for keeping the sheet in its proper position with regard to said rollers, gearing for driving said rollers as required at either of two speeds relatively to the speed of the pulley shaft, an automatic reversing motion whereby the rollers are caused to rotate in the two directions alternately, means for putting said reversing motion out of action to allow the machine to run continuously and a reversing motion adapted to be operated by hand, all substantially as and for the purpose set forth.

In witness whereof we have hereunto signed our names in the presence of two subscribing witnesses.

THOMAS CRITCHLEY BARRACLOUGH.
THOMAS TANNETT HEATON.

Witnesses to the signature of Thomas Critchley Barraclough:
GEORGE C. BACON,
GUSTAV NASSAUER.

Witnesses to the signature of Thomas Tannett Heaton:
WILLIAM WRIGHT,
EMMOTT FORTUNE.